(12) United States Patent
Sumioka

(10) Patent No.: US 8,699,102 B2
(45) Date of Patent: Apr. 15, 2014

(54) READING APPARATUS AND PRINTING APPARATUS COMPRISING A MOVABLE GUIDE BEING ABLE TO SWITCH ATTITUDES FOR READING AND CONVEYING SHEETS

(71) Applicant: Canon Kabushiki Kaisha, Tokyo (JP)

(72) Inventor: Masaki Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/683,304

(22) Filed: Nov. 21, 2012

(65) Prior Publication Data

US 2013/0135648 A1    May 30, 2013

(30) Foreign Application Priority Data

Nov. 25, 2011    (JP) .................. 2011-257422

(51) Int. Cl.
*H04N 1/04*    (2006.01)
(52) U.S. Cl.
USPC .............................. 358/498; 358/474; 270/8.1
(58) Field of Classification Search
USPC ....................................................... 358/498
See application file for complete search history.

(56) References Cited

U.S. PATENT DOCUMENTS

| | | | |
|---|---|---|---|
| 5,416,613 A | 5/1995 | Rolleston et al. | |
| 7,864,783 B2 * | 1/2011 | Brewer et al. ............ | 370/395.65 |
| 8,320,030 B2 * | 11/2012 | Kimura .......................... | 358/498 |
| 8,508,818 B2 * | 8/2013 | Tohnai ........................... | 358/498 |
| 2007/0243278 A1 | 10/2007 | Anelli et al. | |
| 2009/0034027 A1 | 2/2009 | Yoshimoto et al. | |
| 2010/0110435 A1 | 5/2010 | Onishi | |
| 2010/0245950 A1 | 9/2010 | Osakabe | |
| 2013/0135426 A1 | 5/2013 | Wakayama | |

FOREIGN PATENT DOCUMENTS

| | | |
|---|---|---|
| JP | 2008-254221 A | 10/2008 |
| JP | 2008-281549 A | 11/2008 |
| JP | 2010-133915 A | 6/2010 |

OTHER PUBLICATIONS

Canon, Imagerunner Advance 6075/6065/6055 Quick Reference, 2010, pp. 45-46.*
U.S. Appl. No. 13/683,328, filed Nov. 21, 2012, Takeshi Koda.
U.S. Appl. No. 13/683,366, filed Nov. 21, 2012, Masaki Sumioka.
U.S. Appl. No. 13/683,392, filed Nov. 21, 2012, Daigo Kuronuma.
U.S. Appl. No. 13/683,423, filed Nov. 21, 2012, Naoki Wakayama.
U.S. Appl. No. 13/683,450, filed Nov. 21, 2012, Masaki Sumioka.

* cited by examiner

*Primary Examiner* — Benny Q Tieu
*Assistant Examiner* — Michael Y Tzeng
(74) *Attorney, Agent, or Firm* — Canon USA Inc IP Division

(57) ABSTRACT

A reading apparatus includes a movable guide that is able to switch an attitude of a supporting surface thereof relative to a reading unit between a first attitude and a second attitude, and the second attitude is a state where a side to which the sheet is discharged is downwardly open more in the gravity direction than in the first attitude. The movable guide is set to the first attitude during reading of a test pattern by the reading unit, and to the second attitude during discharge of the sheet from below the reading unit.

14 Claims, 7 Drawing Sheets

READING APPARATUS AND PRINTING APPARATUS COMPRISING A MOVABLE GUIDE BEING ABLE TO SWITCH ATTITUDES FOR READING AND CONVEYING SHEETS

BACKGROUND OF THE INVENTION

1. Field of the Invention

The present invention relates to a reading apparatus for performing colorimetry of a color pattern formed on a sheet, and a printing apparatus including the reading apparatus.

2. Description of the Related Art

Japanese Patent Application Laid-Open No. 2008-281549 discuses an ink jet printer including a colorimetric apparatus. This colorimetric apparatus performs colorimetry of a printed color pattern for color calibration and, based on colorimetric data, adjusts colors of a color image to be subsequently printed, thus reproducing desired colors. The printer records color patches as a color pattern for color calibration, and then the colorimetric apparatus performs colorimetry of the color patches with a colorimetric sensor moving in the sheet width direction.

With the colorimetric apparatus, with the sheet being pressed by a presser plate, a carriage on which a colorimetric sensor is mounted moves on the presser plate, and the colorimetric sensor reads the color patches, thus performing colorimetry. When the carriage on which the colorimetric sensor is mounted separates from the presser plate, the presser plate rotates to move away from the sheet.

With the colorimetric apparatus discussed in Japanese Patent Application No. 2008-281549, the sheet conveyance path in a printing unit and a colorimetric unit is greatly inclined downward in the gravity direction, as illustrated in FIG. 4 in Japanese Patent Application No. 2008-281549. Therefore, to increase the capacity of a sheet storage unit for storing discharged sheets disposed at the bottom of the printing apparatus, it is necessary to totally raise the position of main portions of the printing apparatus 100 above the sheet storage unit, and increasing the size of the printing apparatus in the height direction cannot be avoided. This issue becomes distinct particularly with a printing apparatus of the large-format size. With such an apparatus, unused roll sheet is set at the highest position, which may exceed the height of the user's waist. In this case, the user finds it difficult to set heavy roll sheet.

SUMMARY OF THE INVENTION

An example of the present invention is directed to a well-designed reading apparatus achieving both a compact size and high-reliability sheet handling, and a printing apparatus including the reading apparatus.

According to an aspect of the present invention, a reading apparatus includes a reading unit configured to read a test pattern printed on a sheet by a printing unit, and a movable guide having a supporting surface configured to support the sheet to be read by the reading unit, wherein the movable guide is able to switch an attitude of the supporting surface relative to the reading unit between a first attitude and a second attitude, and the second attitude is a state where a side to which the sheet is discharged is downwardly open more in the gravity direction than in the first attitude, and wherein the movable guide is set to the first attitude during reading of the test pattern by the reading unit, and to the second attitude during discharge of the sheet from below the reading unit.

According to an exemplary embodiment, changing the attitude of a sheet supported below a colorimetric unit after colorimetry enables promoting dropping of the sheet by its own weight. This reduces the possibility that the sheet remains in the colorimetric unit and is not discharged. As a result, there is provided a well-designed reading apparatus achieving both a compact size and high-reliability sheet handling, and a printing apparatus including the reading apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
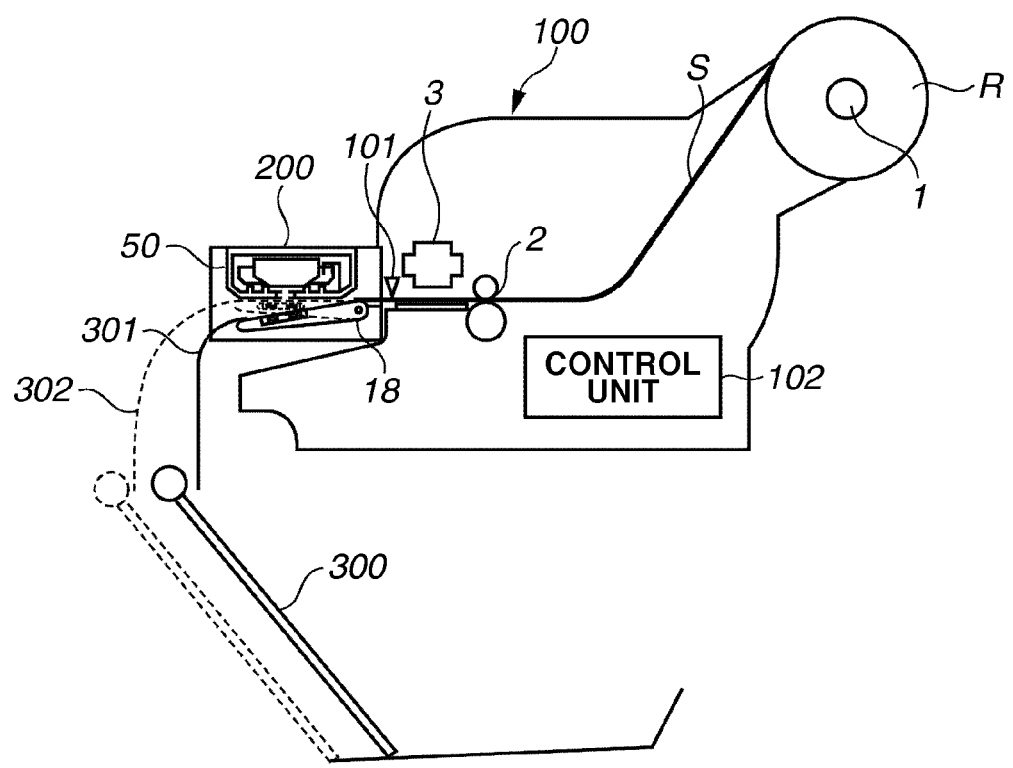
FIG. 1 is a cross sectional view illustrating a configuration of a printing apparatus according to an exemplary embodiment.

An ink jet printing apparatus including a reading apparatus (colorimetric apparatus) according to an exemplary embodiment of the present invention will be described below. FIG. 1 is a cross sectional view illustrating an overall configuration of the printing apparatus according the present exemplary embodiment. A printing apparatus 100 includes a sheet feed unit 1, a conveyance unit 2, a printing unit 3, a cutting unit 101, a control unit 102, a reading unit 200, and a sheet discharge unit 300.

The sheet feed unit 1 rotatably holds a continuous sheet R wound in roll form. The sheet feed unit 1 pulls out a sheet S from the roll, and a conveyance roller pair of the conveyance unit 2 nips the sheet S and conveys it toward downstream. In the context of the present specification, at any position in the sheet conveyance path, the side toward the sheet feed unit 1 is referred to as "upstream" and the opposite side is referred to as "downstream".

The printing unit 3 includes a plurality of print heads corresponding to a plurality of colors. The printing unit 3 forms an image on the conveyed sheet S based on the serial print process or line print process. The plurality of print heads is inkjet print heads, which discharge ink from nozzles based on the inkjet process. The inkjet process may be based on a heater, a piezoelectric element, a micro electromechanical system (MEMS) element, an electrostatic element, and any other devices.

The printing unit 3 can print a test pattern for inspection in addition to a desired regular image on the sheet S. The test pattern refers to a color pattern, such as color patches for color calibration, and a pattern for inspecting any non-discharge state of each nozzle.

The reading unit 200 is disposed downstream of the printing unit 3. The reading unit 200 scans the test pattern formed on the sheet S via a scanner to acquiring color information. The reading unit 200 is detachable from the printing apparatus 100 as one unit. The reading unit 200 includes a scanner unit 50 and a movable guide 18. These units will be described in detail below.

The cutting unit 101 for cutting the continuous sheet R is disposed between the printing unit 3 and the reading unit 200. The cutting unit 101 cuts an area on the sheet S having the formed test pattern, or cuts a plurality of images printed on the sheet S on an image basis.

The sheet discharge unit 300 is a basket-shaped sheet receiving member. A sheet discharged after completion of printing or inspection drops into the sheet discharge unit 300 by the gravity, and is stacked therein.

The printing apparatus 100 according to the present exemplary embodiment enables executing not only the regular mode, in which regular image printing is performed, but also the inspection mode, in which a test pattern is printed and inspected for calibration. In the regular mode, the printing unit 3 prints one or a plurality of images on the sheet S, and the cutting unit 101 cuts the plurality of images on the sheet S on an image basis and discharges them to the sheet discharge unit 300. In the inspection mode, the printing unit 3 prints one or a plurality of test patterns on the sheet S, the reading unit 200 reads the test pattern, and the cutting unit 101 cuts the rear end of the test pattern and discharges the sheet S to the sheet discharge unit 300.

Figure 2:
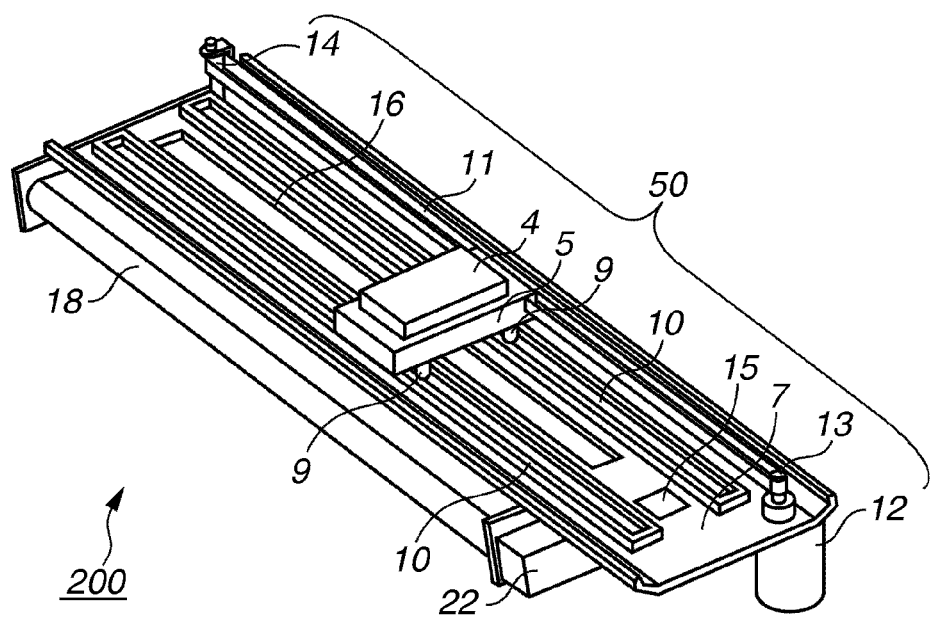
FIG. 2 is a perspective view illustrating an internal configuration of a reading unit.
Figure 3:
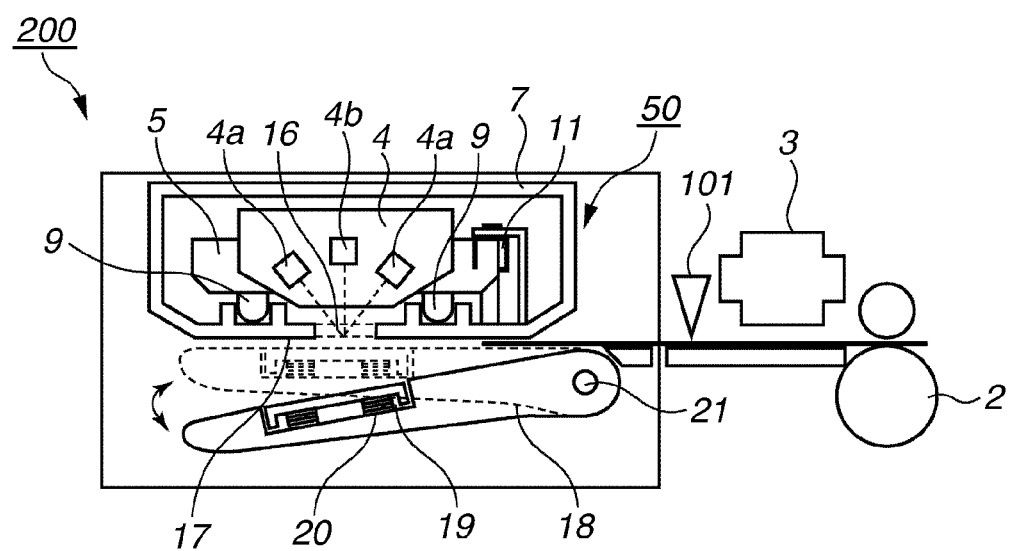
FIG. 3 is a cross sectional view illustrating main portions of the printing apparatus including the reading unit and a printing unit.

The configuration and operations of the reading unit 200 according to the present exemplary embodiment will be described in detail below. FIG. 2 is a perspective view illustrating an internal configuration of the reading unit 200. FIG. 3 is a cross sectional view illustrating main portions of the printing apparatus 100 including the reading unit 200 and the printing unit 3.

The reading unit 200 includes the scanner unit 50 and the movable guide 18. The scanner unit 50 has a frame 7 as a housing for holding therein a sensor unit 4 for scanning color information of a test pattern, and a carriage 5 for holding the sensor unit 4 and for moving along a surface of the sheet S.

The sensor unit 4 includes two light sources 4a and a light-sensitive element 4b. In the printing unit 3, the light sources 4a irradiate with light the test pattern formed on the sheet S from different directions, and the light-sensitive element 4b receives light reflected by the test pattern. Information about the density and colors of the test pattern is acquired based on the signal strength of the light-sensitive element 4b. The light sources 4a and the light-sensitive element 4b may be disposed in reverse.

The carriage 5 is reciprocally movable along a second direction perpendicularly intersecting with a first direction (sheet conveyance direction), being guided by two parallel guide rails 10 on the bottom plate of the frame 7 which is the housing of the scanner unit 50. The range of the reciprocal motion of the carriage 5 covers the sheet width, which is, for example, 60 inches. The bottom portion of the carriage 5 is provided with a plurality of contact members 9 respectively corresponding to the two guide rails 10. When the carriage 5 moves, the contact members 9 contact the guide surfaces of the guide rails 10. The contact members 9 are rotary bodies such as wheels, or sliding bodies having a small surface frictional resistance. As a drive mechanism for reciprocally moving the carriage 5, a driving belt 11, a motor 12, a driving pulley 13, and a driven pulley 14 are provided.

A slit 16 (an opening oblong along the second direction) is formed on the bottom plate of the frame 7. The slit 16 is an opening for allowing passage of light to scan the test pattern. The carriage 5 moves along the longitudinal direction of the slit 16. The sensor unit 4 irradiates the surface of the sheet S with light through the opening of the slit 16 to detect reflected light. In a first alternative embodiment of the present invention, the slit 16 includes a clear member that allows the passage of light but not the passage of ink mist or dust. In a second alternative embodiment of the present invention, the slit 16 is open to the environment such that the sensor unit 4 has an unimpeded and consistent view of the sheet S.

A color calibration plate 15 is disposed on the outside of one end of the slit 16 of the frame 7. The color calibration plate 15 functions as a reading criterion for performing calibration for temporal change in the reading characteristics of the sensor unit 4 accompanying temperature change and aging. When performing calibration, the sensor unit 4 moves to a position where it faces the color calibration plate 15. The sensor unit 4 detects colors to acquire information about colors and brightness of the color calibration plate 15 based on a detector output.

The reading unit 200 further includes the movable guide 18 having a supporting surface for supporting the sheet S from which the test pattern is to be read. The movable guide 18 is provided at a position facing the bottom plate of the frame 7. The movable guide 18 is provided with a supporting member 19 for supporting the sheet S from the back side thereof and an elastic member 20 for elastically supporting the supporting member 19 on the back side thereof. A surface including the surface of the supporting member 19 forms the above-described supporting surface.

The movable guide 18, driven by a drive mechanism 22 attached to a surface of the bottom plate of the frame 7, rotates centering on a rotation shaft 21 to enable changing the attitude of the supporting surface with respect to the sensor unit 4 to the first and second attitudes. The first attitude is a state where the sheet discharge side (downstream side) is open more than in the second attitude. The supporting surface is horizontal in the first attitude, and is inclined so that the downstream side is lowered in the gravity direction in the second attitude.

The bottom surface of the bottom plate of the frame 7 serves as a contact surface 17 for pressing the sheet S against the supporting surfaces of the movable guide 18 during reading. The slit 16 is formed at the center of the contact surface 17. When the movable guide 18 is set to the first attitude, the supporting surface of the movable guide 18 is pressed onto the contact surface 17. In the first attitude, flatness errors of the contact surface 17 and the supporting member 19 are absorbed by the displacement of the elastic member 20, thus uniformly pressing the sheet S. While the carriage 5 is reciprocally moving, the attitude of the sensor unit 4 with respect to the contact surface 17 is maintained constant.

When reading the test pattern, since the movable guide 18 is set to the first attitude, the slit 16 is completely shut by the movable guide 18, preventing external light and ink mist from entering the scanner unit 50 through the slit 16. Thus, high-accuracy reading is enabled.

Figure 5:
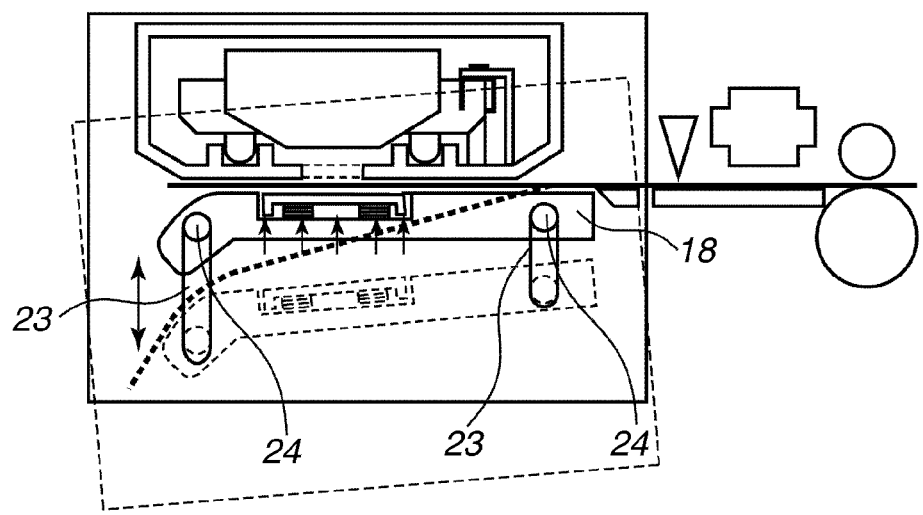
FIG. 5 is a cross sectional view illustrating a configuration of a movable guide according to another exemplary embodiment.

FIG. 5 is a cross sectional view illustrating a configuration of the movable guide 18 according to another exemplary embodiment. In the above-described exemplary embodiment, only the downstream side of the movable guide 18 moves up and down to form a wedge-shaped space. In the present exemplary embodiment, both the downstream and upstream sides of the movable guide 18 move up and down. However, the downstream side moves up and down over a longer distance, and totally open more than the upstream side. Referring to FIG. 5, the movable guide 18 includes a shaft 24 on each of the upstream and downstream sides. Both ends of each shaft 24 are engaged with slots 23 formed on plates on both sides of the frame 7. The slots 23 on the downstream side are larger in the length in the vertical direction than the slots 23 on the upstream side. Therefore, the movable guide 18 provides a larger vertical moving stroke on the downstream side than on the upstream side.

Figure 6:
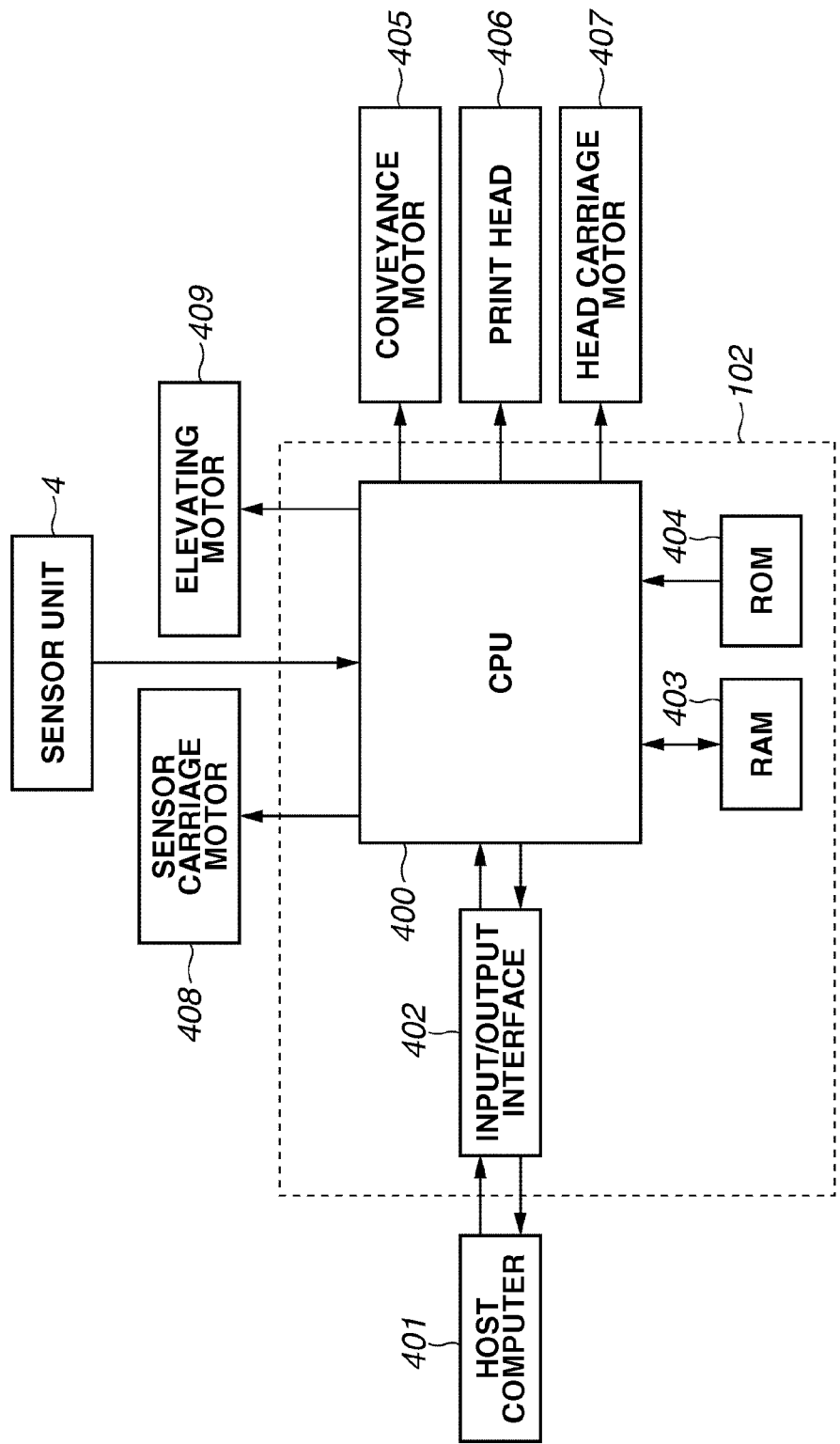
FIG. 6 illustrates a system block diagram centering on a control unit.

FIG. 6 illustrates a system configuration of the printing apparatus 100 according to the present exemplary embodiment centering on the control unit 102. The control unit 300 is a computer system including a central processing unit (CPU) 400, an input/output interface 402, a random access memory (RAM) 403, and a read-only memory (ROM) 404. These elements may be configured as an application specific integrated circuit (ASIC). The CPU 400 totally controls print operations, read operations, and calibration operations according to a control program stored in the ROM 404. The RAM 403 is used as a work area by the CPU 400 to perform these operations. The CPU 400 inputs from a host computer 401 print data and various setting information via the input/output interface 402. The CPU 400 further controls the drive of a conveyance motor 405 for the conveyance unit 2, a print head 406, a head carriage motor 407, a sensor carriage motor 408, and an elevating motor 409 for the drive mechanism 22. The CPU 400 further inputs a signal acquired by a sensor of the sensor unit 4, and performs calibration based on the input signal.

Operations of the reading unit 200 having the above-described unit configuration will be described in detail below with reference to FIGS. 4A, 4B, 4C, 4D, 4E, and 4F. Operations of the reading unit 200 differ between the regular and inspection modes. The inspection mode will be described below.

Figure 4A:
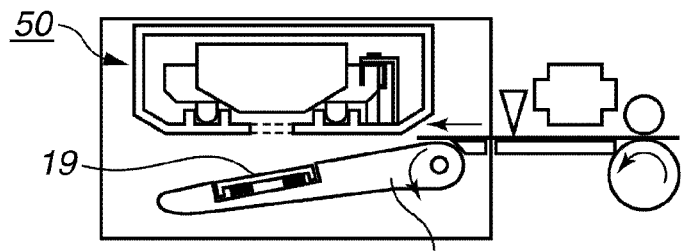
FIGS. 4A, 4B, 4C, 4D, 4E, and 4F illustrate operating states of the reading unit.

The printing unit 3 forms a test pattern on the sheet S supplied from the sheet feed unit 1. In the present exemplary embodiment, the test pattern refers to a color patch pattern for colorimetric color calibration. At this timing, the movable guide 18 is in the second state in which the downstream side thereof is lowered, as illustrated in FIG. 4A.

While moving the sheet S in the forward direction, the printing unit 3 sequentially prints patch rows included in the test pattern on a row basis. The sheet S on which the test pattern is formed is introduced to the reading unit 200, and moves toward downstream, being guided on the supporting surface of the movable guide 18.

If the sheet S used has a tendency to be greatly curled, the leading edge of the sheet S introduced may be curled (curved). In particular, immediately after ink application where ink has not yet been dried, the sheet S has a tendency to be greatly curled. Although the sheet S is curled downward in the example illustrated by a broken line in FIG. 4B, there is also a case where the sheet S is curled upward. If the sheet S is downwardly curled, the curled portion of the sheet S may strongly scrape against the contact surface 17. In this case, ink of the test pattern which has not yet been sufficiently dried may adhere to and stain the contact surface 17, or the test pattern itself may be damaged. If the sheet S is upwardly curled, the leading edge of the sheet S introduced to the reading unit 200 may enter the slit 16, causing conveyance jam.

To solve these issues, in the present exemplary embodiment, the movable guide 18 is set to the second attitude to extend the interval between the supporting surface of the removable guide 18 and the contact surface 17 of the scanner unit 50. Thus, even in the case of the sheet S having a curled leading edge as illustrated by a broken line in FIG. 4B, the above-described issues of abrasion and conveyance jam hardly occur. Of course, the sheet S not curled as illustrated by a solid line does not cause the above-described issues.

Figure 4B:
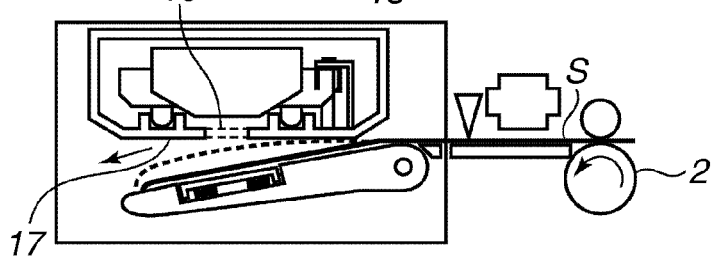
Figure 4C:
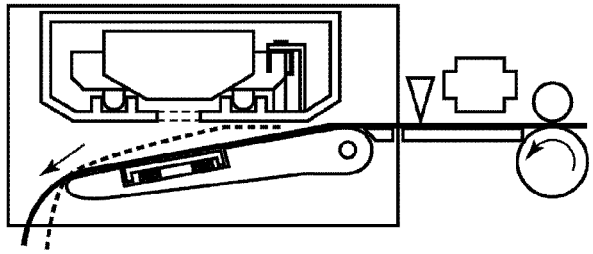

As printing of the test pattern progresses, the leading edge of the sheet S passes the movable guide 18, and then downwardly falls by the gravity toward the sheet discharge unit 300, as illustrated in FIG. 4C. In either case of curled sheet (broken line) or uncurled sheet (solid line), the above-described issues hardly occur. When the entire test pattern has been printed, the control unit 102 advances the sheet S in the forward direction until the rear end of the test pattern (the patch row last formed) passes the movable guide 18, and then stops sheet conveyance. Then, the control unit 102 leaves the sheet S in the stopped state until the printed test pattern has been sufficiently dried (for several minutes to several hours).

Figure 4D:
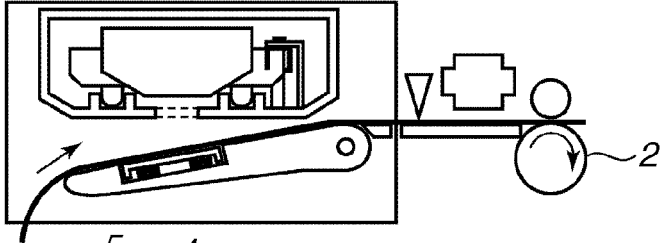

When the test pattern has been dried, the control unit 102 reverses the rotation of the conveyance roller pair of the conveyance unit 2 to back-feed the sheet S in the reverse direction, as illustrated in FIG. 4D. In pattern reading, the scanner unit 50 reads on a row basis the test pattern formed in a plurality of patch rows. To read the patch row printed last, the control unit 102 back-feeds the sheet S until the relevant patch row reaches a position directly under the slit 16, and then temporarily stops the rotation of the conveyance roller pair.

Figure 4E:
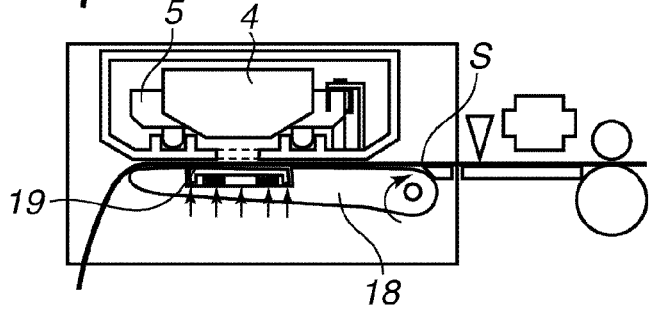

As illustrated in FIG. 4E, the control unit 102 changes the attitude of the movable guide 18 from the second to first attitude via the drive of the drive mechanism 22. In a state where the patch row printed last is positioned directly under the slit 16 (reading position), the sheet S is nipped between the contact surface 17 and the supporting surface of the movable guide 18. In this state, the sensor unit 4 reads the patch rows while the carriage 5 of the scanner unit 50 is moving. The sensor unit 4 sends data of the one read patch row to the control unit 102.

When one patch row has been read, the control unit 102 changes the attitude of the movable guide 18 from the first to second attitude to release the pressing on the sheet S. Then, the control unit 102 step-feeds the sheet S by the amount of conveyance of one patch row to back-feed the sheet S, as illustrated in FIG. 4D. The control unit 102 changes again the attitude of the movable guide 18 from the second to first attitude, and then read the following patch row, as illustrated in FIG. 4E. The control unit 102 repeats this sequence (step-feeding, pressing, reading, releasing pressing, step-feeding, . . . ) for each patch row.

Thus, the control unit 102 reads the entire test pattern formed in a plurality of rows by repeating a one-row read sequence via the reading unit 200 and a step-feed sequence for the sheet. Specifically, the control unit 102 changes the attitude of the movable guide 18 to press the sheet S in the one-row read sequence, and release the pressing on the sheet S in the step-feed sequence.

The attitude of the movable guide 18 during step-feeding may not necessarily be the second attitude, and may be a third attitude having a smaller inclination angle than the second attitude has. Specifically, the movable guide 18 can be set to the third attitude, which is an intermediate attitude between the first and second attitudes, and set to the third attitude during step-feeding. When the leading edge of the sheet S is introduced to the supporting surface first, as illustrated in FIG. 4B, to prevent an issue caused by the curled sheet, it is desirable that the path through which the leading edge of the sheet S is to pass provides a large gap in the vertical direction. On the other hand, in the step-feed sequence after the leading edge of the sheet S has already passed the path, it is sufficient that the relevant path provides a minimum gap allowing sheet movement, as illustrated in FIG. 4D. Since the state transition between the first and third attitudes is completed in a shorter time, it is expected that a greater number of patch pattern rows improves the total reading throughput to a more extent.

Figure 4F:
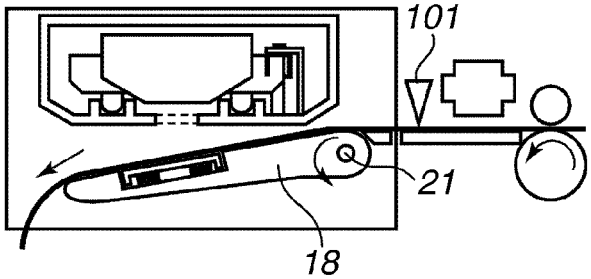

When all of patch rows in the test pattern have been read, the control unit 102 changes the attitude of the movable guide 18 to the second attitude, conveys the sheet S in the forward direction, and discharge it, as illustrated in FIG. 4F.

When the rear end of the test pattern reaches the cutting position of the cutting unit 101, the cutting unit 101 cuts the sheet S. The cut sheet S drops from the leading edge into the sheet discharge unit 300 by its own weight. At this timing, the vicinity of the rear edge of the sheet S cut by the cutting unit 101 is positioned on the movable guide 18, and there is no method for actively discharging the sheet S. However, since the movable guide 18 is set to the second attitude, and the supporting surface is inclined with the discharge side (downstream side) lowered, friction does not disturb the sheet S from dropping. In other words, setting the movable guide 18 to the second attitude when finally discharging the sheet S has a significant meaning.

Based on the data obtained through pattern reading in this way, the control unit 102 acquires information about colors of the test pattern. Then, the control unit 102 performs color calibration for adjusting the amount of ink applied by the print heads for respective colors so that desired colors are reproduced in the final print product.

The above-described sequences are operations performed in a mode of calibration. When printing a desired regular image, not a test pattern, the reading operation is not required. In the regular mode, the movable guide 18 remains set to the second attitude in each of operations for printing a plurality of images, cutting a sheet on an image basis, and discharging the cut sheet.

Figure 7:
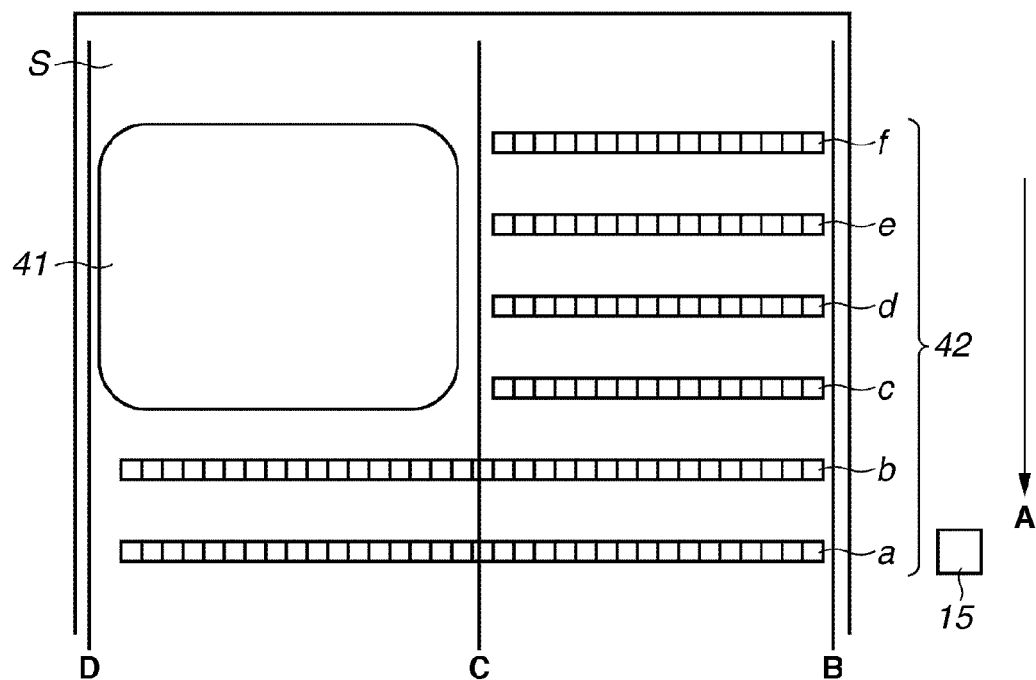
FIG. 7 illustrates an example of a test pattern formed on a sheet.

FIG. 7 illustrates an example of a test pattern formed on the sheet S. The test pattern is formed of a number of color patches 42 and a sample image 41 for comparison before and after color calibration. The layout of the color patches 42 and the sample image 41 can be freely set by the user.

In this example, the color patches 42 are formed in six rows (rows a to f) in a conveyance direction A (back feed direction) of the sheet S. The row f is a patch row on the most downstream side (the leading edge side of the sheet S). The printing unit 3 forms the test pattern in order of the rows f to a. The rows a and b are formed almost over the entire sheet width, i.e., a range from position B to position D. Subsequent rows c, d, e, and f are printed over about a half of the sheet width, i.e., a range from position B to position C. The sample image 41 is formed over the remaining sheet width, i.e., a range from position C to position D.

The reading unit 2 reads the color patches 42 formed in this layout in order of the rows a to f one by one, by repeating step-feeding (back feed). The home position of the carriage 5 exists on the position B side.

The sheet S on which the test pattern is formed by the printing unit 3 is back-fed until the first row a reaches the reading position directly under the slit 16. At this timing, the movable guide 18 is set to the second attitude (the pressing released). Subsequently, the control unit 102 sets the movable guide 18 to the first attitude (pressing attitude) to press the sheet S between the contact surface 17 and the supporting member 19. The control unit 102 reads the patches in the row a one by one from position B to position D via the sensor unit 4 while moving the carriage 5 from position B to position D for scanning. Subsequently, the control unit 102 sets the movable guide 18 to the second attitude, and then step-feeds the sheet S in the backward direction by the distance of one patch row. Then, the control unit 102 sets the movable guide 18 to the first attitude again, and then reads the patches in the row b one by one from position D to position B via the sensor unit 4 while moving the carriage 5 from position D to position B for scanning. When the read sequence for the row b is completed, the control unit 102 sets the movable guide 18 to the second attitude, and then step-feeds the sheet S in the backward direction.

The scanning direction of the read sequence alternately changes for each row in this way. As described above, the scanning direction of the read sequence for each patch row may be constantly the same direction (from position B to position D). In this case, the control unit 102 performs the operation for returning the carriage 5 to a home position (on the position B side) while step-feeding the sheet S.

When subsequently reading the patches in the rows c and d, the control unit 102 sets the scanning range to the distance corresponding to the length of each patch row in the sheet width direction. The control unit 102 sets the movable guide 18 to the first attitude, and then reads the patches in the row c one by one from position B to position C via the sensor unit 4 while moving the carriage 5 from position B to position C for scanning. Subsequently, the control unit 102 sets the movable guide 18 to the second attitude, and then step-feeds the sheet S in the backward direction. The control unit 102 sets the movable guide 18 to the first attitude, and then reads the patches in the row d one by one from position C to position B via the sensor unit 4 while moving the carriage 5 from position C to position B for scanning. When the read sequence for the row d is completed, the control unit 102 sets the movable guide 18 to the second attitude, and then step-feeds the sheet S in the backward direction. Thus, the control unit 102 can shift to the following row without scanning the area of the sample image 41 not subjected to colorimetry, thus improving the reading throughput.

When subsequently reading the patches in the rows e and f, similar to the above-described sequences, the control unit 102 sets the scanning range to the distance corresponding to the length of each patch row in the sheet width direction. However, in this example, after the read sequence for the row e, the control unit 102 performs sensor calibration processing for maintaining constant the reading characteristics of the sensor, which may change with the temperature. In the sensor calibration processing, the control unit 102 reads the color information for the surface of the color calibration plate 15 via the sensor unit 4, and then adjusts the sensor or corrects the sensor output so that correct results of reading are obtained.

The control unit 102 sets the movable guide 18 to the first attitude, and then reads the patches in the row e one by one from position B to position C via the sensor unit 4 while moving the carriage 5 from position B to position C for scanning. In this case, the control unit 102 performs the sensor calibration processing before the read sequence for the row f. Since the color calibration plate 15 is disposed on the position B side, it is necessary to move the sensor unit 4 to the color calibration plate 15. The control unit 102 sets the movable guide 18 to the second attitude, and then moves the carriage 5 from position C to position B, and further up to the color calibration plate 15 outside while step-feeding the sheet S in the backward direction. Then, the control unit 102 sets the movable guide 18 to the first attitude, and then reads the surface of the color calibration plate 15 via the sensor unit 4 to acquire color information. The control unit 102 performs the sensor calibration processing based on the acquired color information. Upon completion of the sensor calibration processing, similar to the above-described sequences, the control unit 102 reads the patches one by one in the last row f from position B to position C, returns the carriage 5 to the home position, and terminates the series of processing.

Upon completion of the read sequences for all of patch rows, the control unit 102 performs color calibration for adjusting the amount of ink applied by the print heads for respective colors so that desired colors are reproduced in the final print product.

The above-described present exemplary embodiment is characterized in that the movable guide 18 can be set to the first and second attitudes. When the leading edge of the sheet S having the printed test pattern is introduced to the movable guide 18, setting the movable guide 18 to the second attitude enables preventing damage to the test pattern and occurrence of conveyance jam. When the sheet S is cut after inspection, setting the movable guide 18 to the second attitude enables smoothly discharging the sheet S and preventing any sheet from remaining in the printing apparatus 100.

Further, when the sheet S is discharged, setting the movable guide 18 to the second attitude enables shifting the sheet discharge position toward the side of the printing apparatus 100, thus reducing footprint thereof. To describe the effect of this action, behaviors of the sheet S being discharged from the reading unit 200 will be compared below. Referring to FIG. 1, a moving trace 301 indicates the shape of a discharged sheet when the movable guide 18 is set to the second attitude (the present exemplary embodiment), and a moving trace 302 indicates the shape of a discharged sheet when the movable guide 18 is set to the first attitude (a virtual exemplary embodiment). The moving trace 302 overflows outside the moving trace 301. Therefore, the position of the sheet discharge unit 300 for receiving a discharged sheet needs to be shifted to the outside, as illustrated by a broken line. This means that the virtual exemplary embodiment provides a larger footprint of the printing apparatus 100 than the present exemplary embodiment does.

Further, when the movable guide 18 is set to the first attitude, the supporting surface is horizontal and, therefore, the size of the printing apparatus 100 particularly in the height direction is compact. This facilitates a user's sheet handling operation for setting heavy roll sheet in the sheet feed unit 1. As described first, with the configuration in which the sheet conveyance path is greatly inclined downward in the gravity direction, as discussed in Japanese Patent Application Laid-Open No. 2008-281549, the increase in size of the printing apparatus 100 in the height direction cannot be avoided. For this reason, the height of a printing apparatus of the large-format size exceeds the height of the user's waist. In this case, the user finds it difficult to set heavy roll sheet.

Further, in the present exemplary embodiment, there is no conveyance roller on the downstream side of the printing unit 3, and the test pattern is read by repeating the step-feed (back feed) sequence. The test pattern printed by the printing unit 3 is not nipped by the conveyance roller at least until the read sequence by the scanner unit 50 is completed. Therefore, regardless of the length of the formed test pattern in the conveyance direction, the test pattern is not damaged and the conveyance roller is not stained by ink before reading, thus ensuring high-accuracy read operations for a prolonged period of time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-257422 filed Nov. 25, 2011, which is hereby incorporated by reference herein in its entirety.

What is claimed is:

1. A reading apparatus comprising:
a reading unit configured to read a test pattern printed on a sheet by a printing unit; and
a movable guide having a supporting surface configured to support the sheet to be read by the reading unit,
wherein the movable guide is able to switch an attitude of the supporting surface relative to the reading unit between a first attitude and a second attitude, and the second attitude is a state where a side to which the sheet is discharged is downwardly open more in a gravity direction than in the first attitude, and
wherein the movable guide is set to the first attitude during reading of the test pattern by the reading unit, and to the second attitude during discharge of the sheet from below the reading unit.

2. The reading apparatus according to claim 1, wherein the supporting surface is horizontal in the first attitude, and is inclined so that a downstream side thereof is lowered in the gravity direction in the second attitude.

3. The reading apparatus according to claim 1, further comprising a mechanism configured to rotate the movable guide centering on a rotation shaft disposed on a side to which the sheet is introduced, to switch the attitude of the supporting surface of the movable guide relative to the reading unit between the first attitude and the second attitude.

4. The reading apparatus according to claim 1, wherein the reading unit includes a sensor configured to read color information of the test pattern, a carriage configured to hold the sensor and to move along a surface of the sheet, and a contact surface configured to press the sheet against the supporting surface during reading.

5. The reading apparatus according to claim 4, wherein the test pattern formed in a plurality of rows is read by repeating a one-row read sequence via the reading unit and a step-feed sequence for the sheet, and
wherein the contact surface and the supporting surface are pressed on each other in the one-row read sequence, and the pressing between the contact surface and the supporting surface is released in the step-feed sequence.

6. The reading apparatus according to claim 5, wherein the attitude of the supporting surface of the movable guide relative to the reading unit is able to be switched to a third attitude that is an intermediate attitude between the first attitude and the second attitude, and the movable guide is set to the third attitude during the step-feed sequence.

7. The reading apparatus according to claim 1, wherein the sheet on which the test pattern is formed by the printing unit is conveyed until an area having the formed pattern passes the reading unit, and subsequently, the reading unit reads the test pattern while the sheet is being conveyed in a reverse direction.

8. A printing apparatus comprising:
the printing unit; and
the reading apparatus according to claim 1.

9. The printing apparatus according to claim 8, wherein a conveyance roller for conveying the sheet is disposed upstream of the printing unit, and no conveyance roller is disposed downstream of the printing unit.

10. The printing apparatus according to claim 8, wherein the reading apparatus is detachable as a unit from the printing apparatus.

11. The reading apparatus according to claim 1, wherein when the movable guide is set to the first attitude, an amount of external light entering the reading unit is less than when the movable guide is set to the second attitude.

12. The reading apparatus according to claim 1, wherein when the movable guide is set to the first attitude, an amount of ink mist entering the reading unit is less than when the movable guide is set to the second attitude.

13. The reading apparatus according to claim 1, wherein when the movable guide is set to the first attitude, the sheet is supported in such a manner that it cannot be conveyed away from the reading unit; and when the movable guide is set to the second attitude, the sheet is supported in such a manner that it can be conveyed away from the reading unit.

14. The reading apparatus according to claim 1, wherein the reading unit is configured to read the test pattern through a slit, and the slit is open to the environment.

\* \* \* \* \*